US008812375B2

(12) United States Patent
Goodman et al.

(10) Patent No.: US 8,812,375 B2
(45) Date of Patent: Aug. 19, 2014

(54) METHOD AND SYSTEM FOR PRODUCT CONFIGURATION VALIDATION

(75) Inventors: Bryan Roger Goodman, Dearborn, MI (US); Melinda Kaye Hunsaker, Canton, MI (US); Yu-Ning Liu, Ann Arbor, MI (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 13/268,276

(22) Filed: Oct. 7, 2011

(65) Prior Publication Data

US 2013/0091033 A1     Apr. 11, 2013

(51) Int. Cl.
*G06Q 30/00* (2012.01)

(52) U.S. Cl.
USPC .................................. 705/26.5; 705/26.1

(58) Field of Classification Search
USPC ............................... 705/26.1–27.2
See application file for complete search history.

(56) References Cited

U.S. PATENT DOCUMENTS

| | | | |
|---|---|---|---|
| 5,515,524 A | 5/1996 | Lynch et al. | |
| 5,708,798 A | 1/1998 | Lynch et al. | |
| 5,825,651 A | 10/1998 | Gupta et al. | |
| 6,002,854 A | 12/1999 | Lynch et al. | |
| 6,115,547 A | 9/2000 | Ghatate et al. | |
| 6,157,922 A | 12/2000 | Vaughan | |
| 6,405,308 B1 | 6/2002 | Gupta et al. | |
| 6,430,730 B1 | 8/2002 | Ghatate et al. | |
| 6,446,057 B1 | 9/2002 | Vaughan | |
| 6,647,396 B2 | 11/2003 | Parnell et al. | |
| 6,675,294 B1 | 1/2004 | Gupta et al. | |
| 6,834,282 B1 | 12/2004 | Bonneau et al. | |
| 6,836,766 B1 | 12/2004 | Gilpin et al. | |
| 6,865,524 B1 | 3/2005 | Shah et al. | |
| 6,871,198 B2 * | 3/2005 | Neal et al. | 1/1 |
| 6,907,414 B1 | 6/2005 | Parnell | |

(Continued)

FOREIGN PATENT DOCUMENTS

| | | |
|---|---|---|
| DE | 102006038978 A1 | 2/2008 |
| DE | 102006060919 A1 | 7/2008 |
| WO | 03009079 A2 | 1/2003 |

OTHER PUBLICATIONS

Bisby, A. (Jan. 28, 2000). Coming soon: Cisco's NPMR. Computer Dealer News, 16, 38.*

(Continued)

*Primary Examiner* — Resha Desai
(74) *Attorney, Agent, or Firm* — Damian Porcari; Brooks Kushman P.C.

(57) ABSTRACT

A computer-implemented method or system that is capable of configuring a product. The computer-implemented method or system receiving a product configuration matrix from a computer storage medium. The computer-implemented method or system also receiving user input defining a user selection of at least one feature or component of the product. The computer-implemented method or system generating a binary representation of the user selection. The computer-implemented method or system deriving a resolution matrix. The method or system comparing the resolution matrix and the binary representation of the user selection to determine whether one or more of the selected product features or components in the user selection are valid for the product. The computer-implemented method or system also generating a validation result that identifies one or more valid product features or components within the user selection.

13 Claims, 12 Drawing Sheets

(56) References Cited

U.S. PATENT DOCUMENTS

| | | | |
|---|---|---|---|
| 6,978,273 | B1 | 12/2005 | Bonneau et al. |
| 7,003,360 | B1 | 2/2006 | Dillon |
| 7,043,407 | B2 | 5/2006 | Lynch et al. |
| 7,062,493 | B1 | 6/2006 | Babka et al. |
| 7,130,821 | B1 | 10/2006 | Connors et al. |
| 7,188,335 | B1 | 3/2007 | Darr et al. |
| 7,200,582 | B1 | 4/2007 | Smith |
| 7,200,583 | B1 | 4/2007 | Shah et al. |
| 7,216,094 | B2 | 5/2007 | Ly et al. |
| 7,236,983 | B1 | 6/2007 | Nabors et al. |
| 7,337,179 | B1 | 2/2008 | Plain |
| 7,343,584 | B1 | 3/2008 | Plain et al. |
| 7,363,593 | B1 | 4/2008 | Loyens et al. |
| 7,426,481 | B1 | 9/2008 | Connors et al. |
| 7,464,064 | B1 | 12/2008 | Smith |
| 7,567,922 | B1 | 7/2009 | Weinberg et al. |
| 7,698,170 | B1 | 4/2010 | Darr et al. |
| 7,739,080 | B1 | 6/2010 | Beck et al. |
| 7,756,759 | B1 | 7/2010 | Emery et al. |
| 2003/0046179 | A1 | 3/2003 | Anabtawi et al. |
| 2008/0270363 | A1* | 10/2008 | Hunt et al. ............ 707/3 |

OTHER PUBLICATIONS

David Horneys, Engineering and Technology Guide, A Better Way to Build to Order, Aug. 13, 1993.

Jon R. Wright et al., A Knowledge-Based Configurator that Supports Sales, Engineering, and Manufacturing at AT&T Network Systems, AI Magazine, vol. 14, No. 3, (Fall 1993).

Classys Sales Automation Overview.

Classys Sales Automation, User's Guide.

Robert George, Configurators Provide a Tool for Cycle Time Reduction.

Manfred Kopisch, et al., Configuration of a Passenger Aircraft Cabin Based on Conceptual Hierarchy, Constraints, and Flexible Control.

M.J. Euwe, Knowledge Engineering, Configuration of Complex Products, Received Apr. 16, 1992; accepted Jun. 26, 1992.

Virginia E. Barker, Communications of the ACM, Expert Systems for Configuration at Digital: XCON and Beyond, vol. 32, No. 3, Mar. 1989.

Gene Thomas, Product Configuration for "To-Order" Industries, IIE Solutions, Mar. 1996.

Department of Computer Science, Carnegie-Mellon University, R1: A Rule-Based Configurer of Computer Systems, John McDermott, Apr. 1980.

J. Tiihonen, et al., State of the practice in product configuration—a survey of 10 cases in the Finnish Industry.

Sanjay Mittal, Felix Frayman, Xerox Palo Alto Research Center, Hewlett-Packard Laboratories, Towards a generic model of configuration tasks.

* cited by examiner

```
{
    "vehicle" : {
300 ─┐    "id":"Vehicle10",
     └─   "name":"2010 Vehicle",
          "feature_families": [
             { "id":"Entity", "name": "Base Product", "group":"Entity"},
             { "id":"Rapid", "name": "Rapid Spec", "group":"Rapid Spec" },
             { "id":"Paint", "name": "Paint" ,"group":"Paint" },
             { "id":"Trim", "name": "Trim", "group":"Trim" },
             { "id":"Radio", "name": "Radio", "group":"Options" },
302 ─┐      { "id":"RevsSens","name": "Reverse Sensing", "group":"Options" }
     └─   ],
          "features": [
             { "id":"1009", "name":"Sport AWD", "familyid":"Base Product" },
             { "id":"1010", "name":"Sport FWD", "familyid":"Base Product" },
             { "id":"78", "name":"400A","familyid":"Rapid Spec" },
             { "id":"79", "name":"401A","familyid":"Rapid Spec" },
             { "id":"80", "name":"402A","familyid":"Rapid Spec" },
             { "id":"44", "name":"Brilliant Silver (UI)", "familyid":"Paint" },
             { "id":"43", "name":"Tuxedo Black (UH)", "familyid":"Paint" },
             { "id":"41", "name":"Candy Red (U6)", "familyid":"Paint" },
             { "id":"42", "name":"Sport Blue (U1)","familyid":"Paint" },
             { "id":"37", "name":"Charcoal","familyid":"Trim" },
             { "id":"39", "name":"Sport Blue", "familyid":"Trim" },
             { "id":"35", "name":"Stone", "familyid":"Trim" },
             { "id":"38", "name":"Sport Red", "familyid":"Trim" },
             { "id":"67", "name":"Single-Cd Radio","familyid":"Radio" },
             { "id":"19", "name":"6-Cd Radio", "familyid":"Radio" },
             { "id":"18", "name":"Navigation Radio (58N)", "familyid":"Radio" },
            ·{ "id":"12", "name":"Reverse Sensing (43P)", "familyid":"RevSens"},
             { "id":"13", "name":"Less Reverse Sensing", "familyid":"RevSens",
304 ─┐                   "visible":false }
     └─   ],
          "super_configurations": [
             "1110011000001010011", "1101100111100001010",
             "1101000111000001101", "1101101111000101010",
             "1101001110001101101", "1101111001010001010",
             "1101010010100001101", "1100100111000000110",
306 ─┐      "1100101100000100110", "1100110010100000110"
     └─   ], "default_config": [
             "1010001000001010001"
          ]
       }
    }
```

```
Product Configuration    11 100 1100 0010 100 11
User Configuration       10 100 0100 0010 100 01
Mathematical AND         10 100 0100 0010 100 01
```

Figure 5a

```
Product Configuration    11 100 1100 0010 100 11
User Configuration       10 010 0100 0100 100 01
Mathematical AND         10 000 0100 0000 100 01
```

Figure 5b

```
10 010 1000 0001 010 01    invalid configuration
10 010 1000 0101 010 01    Sport Blue added
10 010 1000 0100 010 01    Sport Red removed
```

Figure 13

| Product Configuration | | | | | | Resolution Matrix for "Reverse Sensing" | | | | | |
|---|---|---|---|---|---|---|---|---|---|---|---|
| 11 | 100 | 1100 | 0010 | 100 | 11 | 11 | 100 | 1100 | 0010 | 100 | 11 |
| 11 | 011 | 0011 | 1000 | 010 | 10 | 11 | 100 | 0011 | 1000 | 010 | 10 |
| 11 | 010 | 0011 | 1000 | 010 | 10 | 11 | 011 | 0111 | 0001 | 010 | 10 |
| 11 | 011 | 0111 | 0001 | 010 | 01 | 11 | 011 | 1001 | 0100 | 010 | 10 |
| 11 | 010 | 0111 | 0001 | 011 | 01 | 11 | 011 | 0011 | 1000 | 001 | 10 |
| 11 | 011 | 1001 | 0100 | 010 | 01 | 11 | 001 | 0110 | 0001 | 001 | 10 |
| 11 | 010 | 1001 | 0100 | 011 | 01 | 11 | 001 | 1001 | 0100 | 001 | 10 |
| 11 | 010 | 0011 | 1000 | 001 | 10 | | | | | | |
| 11 | 001 | 0011 | 1000 | 001 | 10 | | | | | | |
| 11 | 001 | 0110 | 0001 | 001 | 10 | | | | | | |
| 11 | 001 | 1001 | 0100 | 001 | 10 | | | | | | |

Figure 7a

| Product Configurations | | | | | | User Configuration | # of Valid Selections |
|---|---|---|---|---|---|---|---|
| 11 | 100 | 1100 | 0010 | 100 | 11 | | 6 |
| 11 | 011 | 0011 | 1000 | 010 | 10 | | 2 |
| 11 | 011 | 0111 | 0001 | 010 | 10 | [10 100 0100 0010 100 10]$^T$ = | 3 |
| 11 | 011 | 1001 | 0100 | 010 | 10 | | 2 |
| 11 | 001 | 0011 | 1000 | 001 | 10 | | 2 |
| 11 | 001 | 0110 | 0001 | 001 | 10 | | 3 |
| 11 | 001 | 1001 | 0100 | 001 | 10 | | 2 |

Figure 7b

```
Resolution Matrix        User Configuration                    # of Valid Features
11 100 1100 0010 100 11
11 011 1001 0100 010 10  [10 010 1000 0001 010 01]ᵀ =                3
11 010 1001 0100 011 01                                               4
11 001 1001 0100 001 10                                               5
                                                                      ─
                                                                      2
```

Figure 7c

```
Resolution Matrix        User Configuration                    # of Valid Features
11 011 0011 1000 010 10                                               3
11 010 0011 1000 011 01  [10 100 0100 1000 100 10]ᵀ =                 ─
11 001 0011 1000 001 10                                               2
                                                                      3
                                                                      ─
```

Figure 7d

```
11 010 1001 0100 011 01    target configuration
10 010 1000 0001 010 01    user configuration
10 010 1000 0000 010 01    AND'd value
```

Figure 7e

```
10 100 0100 1000 100 10    user configuration
11 011 0011 1000 010 10    target #1
10 000 0000 1000 000 10    AND'd value 1

10 100 0100 1000 100 10    user configuration
11 001 0011 1000 001 10    target #2
10 000 0000 1000 000 10    AND'd value 2
```

Figure 7f

```
10 000 0000 1000 000 10    AND'd value 1
10 000 0000 1000 000 10    AND'd value 2
20 000 0000 2000 000 20    CHECKSUM
```

Figure 7g

```
10 010 0100 0001 001 10    configuration 11 001 0110 0001 001 10    target 1
11 011 0111 0001 010 10    target 2

10 000 0100 0001 001 10    AND'd value 1
10 010 0100 0001 000 10    AND'd value 2
20 010 0200 0002 001 20    CHECKSUM
```

Figure 7h

```
11 011 0011 1000 010 10    target 1
11 001 0011 1000 001 10    target 2

11 011 0011 1000 011 10    OR operator value
11 001 0011 1000 000 10    AND operator value
```

Figure 7i

```
11 011 0011 1000 011 10    OR operator value
11 001 0011 1000 000 10    AND operator value
```

Figure 7j

```
01 001 0100 0010 001 10    Configuration
         x    x
11 011 0111 0101 100 10    Target 1
11 001 0110 0101 010 10    Target 2
          0101 110         OR operator value
          0101 000         AND operator value
```

Figure 8

```
10 100 0100 1010 100 10    configuration
   x             x
11 011 0011 1000 010 10    target #1
11 001 0011 1000 001 10    target #2
   011 0011         011    OR operator value
   001 0011         000    AND operator value 011 0011                Target Values
```

Figure 9a

| "Entity" Family | | "RapidSpec" Family | | | "Paint" Family | | | | "Trim" Family | | | | "Radio" Family | | | "RevSens" Family | |
|---|---|---|---|---|---|---|---|---|---|---|---|---|---|---|---|---|---|
| Entity.a | Entity.b | Rapid.a | Rapid.b | Rapid.c | Paint.a | Paint.b | Paint.c | Paint.d | Trim.Charcoal | Trim.SportBlue | Trim.Stone | Trim.SportRed | Radio.SingleCd | Radio.6Cd | Radio.Nav | RevSens.a | RevSens.b |
| 1 | 1 | 0 | 1 | 1 | 1 | 1 | 0 | 0 | 0 | 0 | 1 | 0 | 0 | 1 | 0 | 1 | 1 |
| 1 | 1 | 0 | 0 | 1 | 0 | 0 | 1 | 1 | 1 | 0 | 0 | 0 | 0 | 0 | 1 | 1 | 0 |

Figure 9b

```
AND operator value target 1    10 000 0100 0001 001 10
AND operator value target 2    10 010 0100 0001 000 10
```

Figure 9c

```
100 10 001 001 01  User Configuration    Target 1    100 10 000 000 01 AND'd value 1
                                         Target 2    100 10 000 000 01 AND'd value 2
110 10 110 100 01                        Target 3    000 00 001 001 01 AND'd value 3
110 11 010 110 01
011 01 001 111 11
```

Figure 10

```
0  1  0  0    target configuration
0  0  0  1    user configuration
0 +1  0 -1    difference
```

Figure 11

METHOD AND SYSTEM FOR PRODUCT CONFIGURATION VALIDATION

TECHNICAL FIELD

Embodiments of the present invention relate generally to methods and systems for product configuration, selection and validation.

BACKGROUND

Traditional product configuration systems determine the validity of a product configuration based on the compatibility of the various components or sub-systems that a particular product may comprise. Such systems guide and/or validate the product selection process in a "bottom-up" approach by applying rules or constraints defining component or sub-system interrelationships as those components or sub-systems. These rules and constraints may be defined, organized and/or applied in a hierarchical fashion.

For complex systems in which there is a wide selection of possible product configurations involving potentially hundreds or thousands of components or sub-systems, the volume of rules and constraints that must be defined, and then applied during the configuration and selection process, can materially impact the performance of the system and the efficiency of the process overall. In addition, a large volume of interrelationship rules and constraints increases the possibility of error in the rule/constraint definition process. Finally, this approach makes product definition a labor intensive and overly complex process because inter-component compatibility must be defined for each component or sub-system in the product. This increases the complexity of implementing changes among components, or to component compatibility, within the configuration system.

U.S. Pat. No. 5,515,524, presently assigned to Versata Development Group, Inc., discloses a constraint based configuration system that uses a functional hierarchy to generate structural relationships and other physical interconnections between components that may make up a configuration. The structural hierarchy model includes the Component, Composite, Container, Port, and Connector base classes. These base classes may branch into derived classes (i.e., system-specific classes) and terminate at leaf-descendants. Leaf-descendants define the type of components in the functional, structural hierarchy model. Attributes, data types, resources, and constraints further define the model. The structural hierarchy includes a container structure to specify that one component is contained by, or in, another component. In addition, the structural specification provides the ability to specify the connections between components of a configured system. As components are added to a configuration, the physical and logical interconnections that are required to assemble the system components may be verified.

U.S. Pat. No. 5,825,651, presently assigned to Versata Development Group, Inc., discloses a "drag and drop" configuration system. The system operates based on a product definition defining the interrelationships between the parts or components that may make up a product. A maintenance system is provided for specifying the part relationships. Part-to-part relationships may be created between parts within a product. Parts in a product definition may be related or classified as included, required choice, excluded, removed and optional. Similar parts may grouped together to form a part hierarchy.

Embodiments of the invention described herein provide a different and more efficient "top down" approach to product configuration. Unlike prior art systems which validate a product configuration selection against rules defining valid component interrelationships that make up a product, embodiments of the present invention validate a product configuration selection against the matrix of valid end-product configurations themselves. With this architecture, efficiency and flexibility may also be achieved with system deployment configurations and resolving invalid selections in the configuration process.

SUMMARY

One or more embodiments include a computer-implemented method or system for configuring a product. The computer-implemented method or system being configured to receive, at one or more computers, a product configuration matrix from a computer storage medium. The computer-implemented method or system also receiving at the one more computers a user input defining a user selection of at least one feature or component of the product. The computer-implemented method or system also generating at the one or more computers a binary representation of the user selection. The computer-implemented method or system deriving at the one more computers a resolution matrix. The method or system comparing at the one or more computers the resolution matrix and the binary representation of the user selection to determine whether one or more of the selected product features or components in the user selection are valid for the product. The computer-implemented method or system also generating at the one or more computers a validation result that identifies one or more valid product features or components within the user selection.

These and other aspects will be better understood in view of the attached drawings and the following detailed description.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

FIG. 3 illustrates a non-limiting example of a product definition;

FIG. 4a illustrates a non-limiting table according to one embodiment;

FIG. 4b illustrates another non-limiting table according to one embodiment;

FIG. 5a illustrates another non-limiting table according to one embodiment;

FIG. 5b illustrates another non-limiting table according to one embodiment;

FIG. 7a illustrates another non-limiting table according to one embodiment;

FIG. 7b illustrates another non-limiting table according to one embodiment;

FIG. 7c illustrates another non-limiting table according to one embodiment;

FIG. 7*d* illustrates another non-limiting table according to one embodiment;

FIG. 7*e* illustrates another non-limiting table according to one embodiment;

FIG. 7*f* illustrates another non-limiting table according to one embodiment;

FIG. 7*g* illustrates another non-limiting table according to one embodiment;

FIG. 7*h* illustrates another non-limiting table according to one embodiment;

FIG. 7*i* illustrates another non-limiting table according to one embodiment;

FIG. 7*j* illustrates another non-limiting table according to one embodiment;

FIG. 8 illustrates another non-limiting table according to one embodiment;

FIG. 9*a* illustrates another non-limiting table according to one embodiment;

FIG. 9*b* illustrates another non-limiting table according to one embodiment;

FIG. 9*c* illustrates another non-limiting table according to one embodiment;

FIG. 10 illustrates another non-limiting table according to one embodiment;

FIG. 11 illustrates another non-limiting table according to one embodiment;

FIG. 13 illustrates another non-limiting table according to one embodiment;

DETAILED DESCRIPTION

Figure 1:
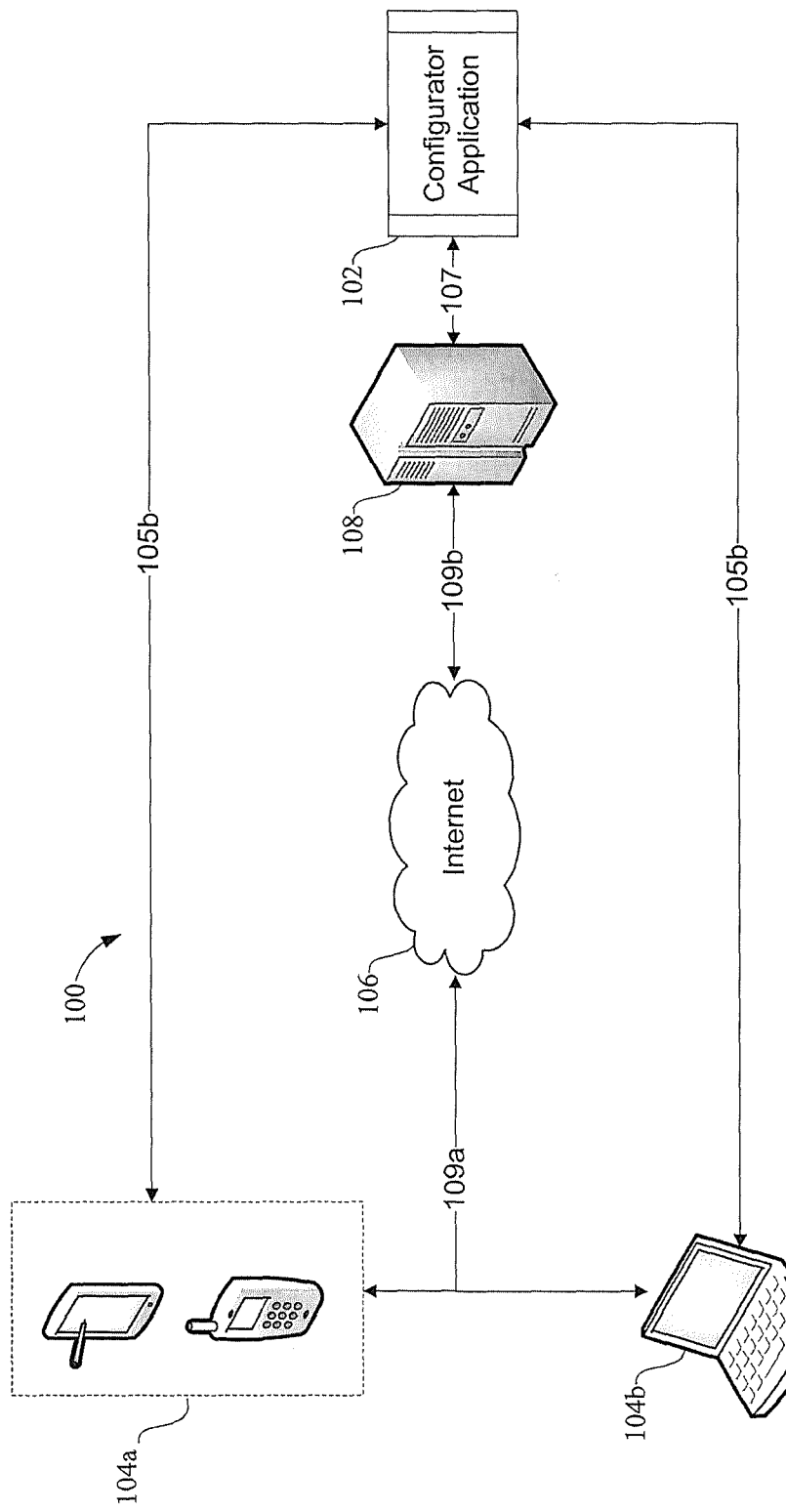
FIG. 1 is a block topology of a system for product configuration validation.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

A product space, or product definition, may comprise all of the allowed ways of combining features (or parts, options, or attributes) of a product in order to make a complete product (e.g., an without limitation, a vehicle). For example, a company might sell a product in two levels (e.g., base and luxury), A1 and A2, and in three colors, B1, B2 and B3. Further, the company may only offer the base model, A1, in one color, B1. The product configuration space includes the following four configurations: A1B1, A2B1, A2B2, and A2B3.

A configurator application may allow the user to select options or features to create or modify a configuration. When a user changes a configuration by adding or removing a feature, the configurator may validate the new configuration. If the new configuration is invalid, the configurator may prompt the user to modify the selection, propose a selection that will result in a valid product configuration, or make the necessary changes to the existing selection. To perform this validation, the configurator application may determine if the selected configuration fits within the allowed product space, as described in greater detail below.

A configurator application may run on a client device, such as (and without limitation), a personal computer or a nomadic device such as a mobile phone, with available resources. Other non-limiting examples may include a smartphone, tablet computer, or other portable device. The client device may include a microprocessor and volatile or non-volatile computer storage medium, including, but not limited to, Flash memory, EEPROM, RAM, DRAM, hard disk drives, solid state drives or optical drives. The computer storage medium may also be an external form of computer storage medium, including, but not limited to, External flash or hard drives, or remote (e.g., "cloud") storage devices. However, it is further contemplated that the configurator application may be loaded and run from a server terminal from which a personal computer or nomadic device could connect. It is contemplated that the server terminal would also include a microprocessor and volatile or non-volatile computer storage medium, such as that used on the client device. It is also desirable to minimize the amount of data that is transferred between the application server and the application client.

In one embodiment, the configurator application uses a numerical representation of product space or valid product configurations and a set of algorithms to validate a configuration based on the representation. These algorithms may utilize binary-vector logical and algebraic operations, thereby minimizing computational resource consumption, decreasing validation errors, and/or providing improved efficiency in validation processing.

Where a product is made up of one or more feature families containing two or more features, a valid configuration may consist of exactly one feature selected from each feature family. A buildable configuration may be a valid configuration that falls within the allowed product space. If there are no product space restrictions, every configuration may be a valid configuration.

Product configuration may restrict the product space by providing a complete representation of features, or combinations of features, are standard, not available, optional, or excluded. Product definitions may include a list and descriptions of feature families and features, and product configurations.

FIG. 1 illustrates a block topology of a system 100 for product configuration validation in accordance with one non-limiting embodiment of the present invention. The configurator application 102 may be a client application that allows a user to add and remove features of a buildable product to build a valid custom product. The configurator application may allow a user to explore the allowed product space as opposed to what is only available in product inventory. In some embodiments, the application 102 may be implemented using AJAX technology (i.e., asynchronous Java Script and XML technology).

The application 102 may be installed and executed from a client terminal, such as a personal computer 104*a* and/or a nomadic device 104*b* (e.g., a tablet, a mobile phone, and the like), and/or remotely (e.g., executing on a remote server 108 and accessed and operated via the Internet 106). As non-limiting examples, the application 102 may be deployed as a rich internet application, a smart phone application (e.g., a mobile application) or a standalone application for a personal computer. The application 102 may alternatively be deployed as web-based application. For example, the application 102 may be implemented as a web application in Java compiled to JavaScript.

FIG. 1 illustrates at least two embodiments in which the configurator application 102 may be loaded and run. First, the configurator application may be loaded and run on one or more client devices 104a, b. The configurator application 102 may be installed to the client device 104a, b from a computer-readable storage medium such as (and without limitation) a CD-ROM, DVD or USB thumb drive. Alternatively, the mobile devices 102a, b may connect to server 108 via connection path 109a, b using the Internet 106. Finally, the application 102 may be downloaded to the client devices 104a, b via a wireless technology, such as cellular or Wi-Fi.

As another alternative, the application 102 may be loaded and run on the one or more servers 108 which are in communication with the client terminals 104a, b via the Internet 106 through communication path 109a, b. In this case, data and operations may be exchanged through connection 109a, b between the configurator application 102 and the client devices 104a, b via the Internet 106.

When a product is configured by a user, the user may select a product for configuration. Upon selecting the product, the product definition, and optionally, pricing information, may be downloaded from the server 108 to the client device 104a, b. However, it should again be noted that the product, product definition, and optional pricing information may be loaded on the server 108 and the client devices 104a, b may connect to the server 108 to access this information. The product definition may also be sent to the client 104a, b in a compressed structural format. Until the point that the user submits the full configuration back to the server 108, all of the work relating to configuring the product may be performed on the client device 104a, b. The data from the client device 104a, b may, or may not, be asynchronously transmitted back to the server 108. In one embodiment, all configuration validation and pricing calculations may be performed on the client device 104a, b.

Figure 2:
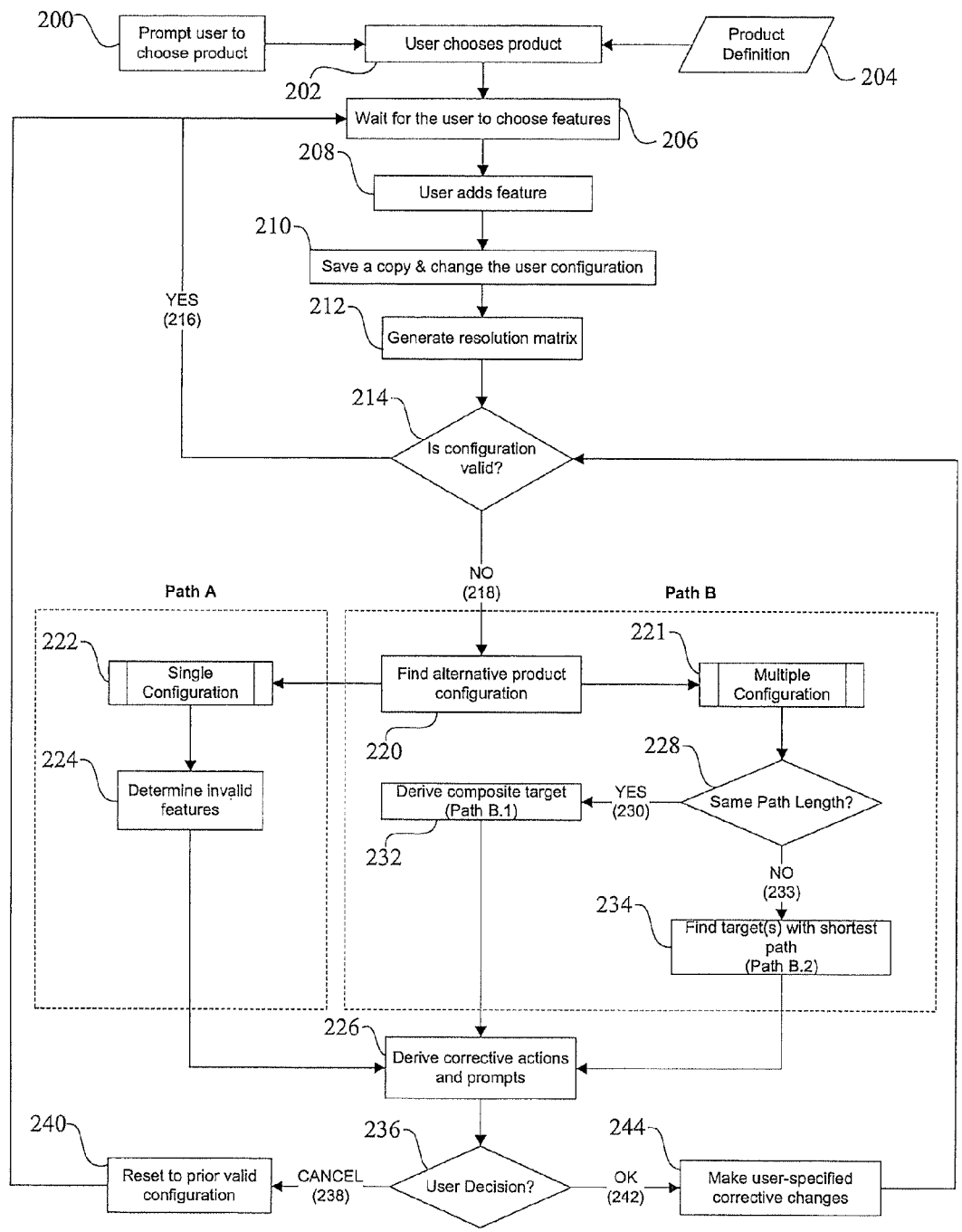
FIG. 2 illustrates the product configuration validation process according to one of the various embodiments.

The user may be presented with a list of product features, the current configuration contents and, in some embodiments, the current configuration price. The product feature list may be presented as a checkbox list or any other alternative display allowing multiple selections. A non-limiting example of a product feature list is illustrated in FIG. 2. The product feature list may be sub-divided into display groups which can be displayed on a single page, or subdivided using tabs or other mechanisms to separate information into multiple groups that can be selectively displayed or hidden.

When a user adds or removes a feature to a configuration, the new configuration may be validated against the product configuration matrix representing the allowed product space. The allowed product space may represent an open universe of possible configuration options. If the new configuration is not within the allowed product space, the user may be prompted with necessary corrective actions and possibly with one or more choices. Once a configuration is defined that is within the allowed product space, contents and price may be displayed and the user may be allowed to make another change.

Corrective actions may include adding one or more features, removing one or more features, or adding a feature from a specified list. As a non-limiting example, if widget A1 requires accessories B1 and C1 in the product matrix, when user adds A1, the user will be prompted to add B1 and C1. If option D1 is available only with bundle E1 in the matrix, when user removes E1, the user will be prompted to remove D1. If option F1 is available only in bundle G1 or H1 in the matrix, when user adds F1, the user will be prompted to add G1 or H1. The user may cancel the current change and revert back to the prior valid configuration. In some embodiments, a user may be prompted for every necessary change. In additional or alternative embodiments, corrective actions may be taken automatically and the user may be prompted only if one or more choices exist.

A user's add request may always be allowed. As a result, by adding the feature, a prior value from that feature family may also always be removed. In some embodiments, if the user removes a feature from a family without a null feature, the removal action may be ignored. Instead, the user may be required to change this choice by adding an alternative feature from the same family. Paint color is a non-limiting example of a family without a null feature. Thus, using paint color as an example, a user cannot remove a paint color, but may be required to pick an alternative paint color to add in its place. Alternatively, if a user removes a feature from a family that has a null feature, the null feature may be added in its place. Appearance Package is a non-limiting example of a family that may have a null feature. For example, the family may include Appearance Package #1, Appearance Package #2, and "Less Appearance Package. Thus, using appearance package as an example, the user may remove Appearance Package #1 and "Less Appearance Package" may be added in its place. As used herein, the use of "less" and the name of the feature (e.g., "less appearance package") refers to the absence of a feature from the feature family.

If a user makes a change resulting in an invalid configuration, the configurator may prompt the user with one or more changes necessary to make the configuration valid. Starting from an invalid configuration, there may be many sets of corrective actions that would make the configuration valid. These sets of corrective actions may also be termed "resolution paths."

The length of the resolution path may be defined by a composite of two metrics. The primary metric may be the number of feature changes in the path. Based on this metric, fewer feature changes may result in a shorter path. The secondary metric may be the priority level of the families involved in the feature changes. Based on this metric, one or more changes in lower priority families may result in a shorter path than the same number of changes in higher priority families. A family priority may be a ranked order of families with the least important families being ranked the lowest. The family priority may be pre-defined. In some embodiments, the secondary metric may be used to discriminate between paths with the same primary metric.

Given an invalid configuration, the shortest path may lead to the closest valid configuration. Therefore, it may be desirable to find the shortest path to a valid configuration state exclusive of paths that undo the current feature change request.

In some embodiments, each configuration from a user may include a price. There are multiple alternatives for pricing configurations. In one embodiment, a table may be maintained which includes an index of configurations and the associated prices for each configuration. When a configuration is selected, the price may be looked up in the table. In another embodiment, a table of features may be maintained which includes associated prices for each feature. A price for the current configuration may be calculated by summing prices of the included features. In another embodiment, the price of a configuration is retrieved from a separate service or information system.

The application 102 may include logic to handle multiple valid configurations where the price may differ depending on which features were or were not included in a configuration. For example, features that are otherwise identical but differ in price may be replicated. Additionally, artificial features that represent pricing discounts can take on negative price values.

FIG. 2 illustrates an exemplary process for validating a product configuration created by a user. The validation process may include validating a configuration against a defined product definition space. If a selected feature change from the user results in the desired configuration falling outside of the allowed configuration space, the validation process may be used to guide a user to the shortest path or paths back to the allowed configuration space. In one embodiment, the configuration application 102 may uses an encoding scheme that allows for compression and efficient validation processing.

The product definition information, which may represent the space of available product configurations, may be stored in a compressed-binary-available-feature-space representation, which may be referred to as a product configuration.

A non-limiting example of a product definition data format is provided in FIG. 3. In the example shown in FIG. 3, the product id is "Vehicle10" and the product name is "2010 Vehicle." The product definition data may be implemented in JSON (Java Script Object Notation) data format. Other non-limiting formats may include XML or a binary file format.

As is further shown in FIG. 3, a list of feature families 300 may be defined by a series of tags, such as "id," "name," and "display group." The display group may be used to group one or more feature families into logical groupings. Non-limiting examples may include "Paint and Trim" and "Interior Options." A list of features 302 may also be defined by a series of tags, such as "id," "familyid," "name," "order code," "description," and "visible." In this embodiment, where visible=false, the feature may not be displayed. As a non-limiting example, "reverse sensing" may also not be displayed to the user.

FIG. 3 also illustrates list of valid product configurations 304. The product configurations may be a bit-matrix of 0's and 1's where each row represents a set of features containing at least one feature from a corresponding family. Each product configuration, or row in the matrix, may have more than one feature in a feature family. In short, one or more valid product configurations may be a compressed form of representing configurations.

As additionally shown in FIG. 3, the product definition data may also include a default configuration 306.

Figures 4A, 4B:
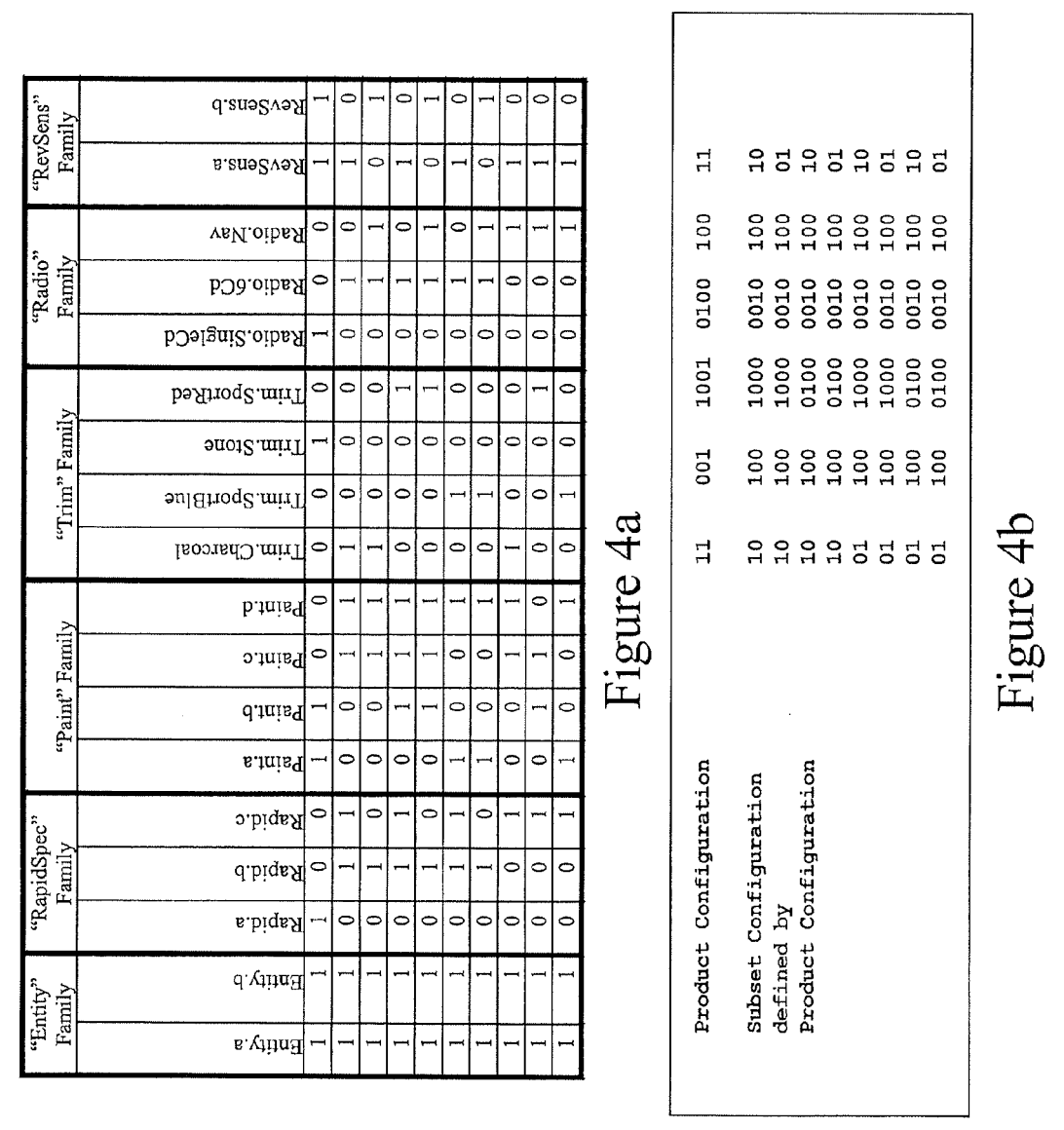

Non-limiting examples of product configuration matrices for a sample vehicle is shown in Tables 1 and 2 FIG. 4a. As illustrated, FIG. 4a includes a header that can be used to describe the family and each feature for a corresponding family.

A product configuration may represent more than one possible configuration. The number of potential configurations represented by a product configuration can be calculated as the product of the sums of each family in the product configuration.

FIG. 4b illustrates an exemplary table of the expansion of a product configuration into the configurations it may define. As shown in FIG. 4b, the product configuration may also expand into eight subset product configurations. The product of the sums may be used to determine the subset of product configurations (e.g., (2×1×2×1×1×2)=8).

When a product configuration includes the definition of a user configuration, the product configuration may cover that configuration. That is, each feature included in the user configuration may be included in the product configuration. Mathematically, this may be determined by using a logical conjunction (AND operator) between the elements of the product configuration and user configuration. If the resulting configuration is identical to the result of the logical conjunction, the user configuration is determined to be included within the product configuration. FIG. 5a shows an exemplary illustration where the user configuration is included within the product configuration.

If the configuration is not identical to the result of the logical conjunction, one or more features in the user configurations may not be included in the product configuration. In this case the user configuration may not be contained in the product configuration definition, and is therefore not covered by the product configuration. FIG. 5b shows an exemplary illustration where the user configuration is not covered by the product configuration. As illustrated, the logical conjunction of the user and product configurations results with a "zero" value for the second and fourth families (underlined).

With reference back to FIG. 2, the user may be presented with a list of products such as vehicles. In some embodiments, the user may additionally be prompted to choose a product (block 200). The user may choose a vehicle to configure (block 202). Once a product is chosen, the product definition (e.g., the default configuration) for the chosen vehicle may be loaded (data file 204). The product definition includes a list of features for the chosen vehicle which may include a list of valid product configurations for the selected product.

Figure 6:
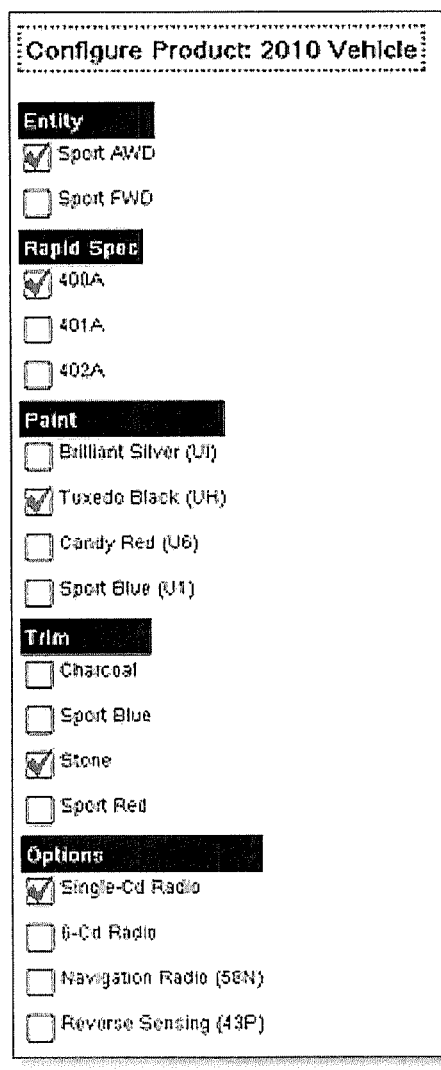
FIG. 6 is a non-limiting example of a user prompt.

A non-limiting example of the default configuration presented to the user is illustrated in FIG. 6. In one embodiment, features may be displayed by group and ordered by family index value and feature index value. A non-limiting example of an index value may be an alphabetical ordering of the names. As shown in FIG. 6, all features may be displayed on a single page. In other embodiments, tabbed-pages may be used to separate the display of each group. In other embodiments, each feature may be displayed individually on a page such that each feature may be displayed in response to user input (e.g., a link or command button) to display the next feature.

To generate a custom configuration, the user may choose features to add to a current configuration. The application 102 may wait for the user-desired features for modification to be chosen (block 206). Once chosen, the proposed configuration of the vehicle based on, for example, the user adding the feature(s) may be received at the client device 104a, b or at the server 108 (block 208).

In certain embodiments, a family may include a null feature which may be, for example, a feature that is not visible. In such embodiments, where the family contains a null feature, e.g., a "less" feature that is not visible, the user may modify the configuration by removing a feature. For example, in order to add "Less Reverse Sensing," which is not visible, the user removes the visible feature "Reverse Sensing." This remove request is rephrased as a logically equivalent add request which simplifies the implementation because the application 102 may only have to handle add requests.

Where the family does not contain a null feature, the user may not be allowed to remove features for that family. Rather, another feature may be required to be added from that family to replace the current choice. For example, referring to FIG. 6, there is no feature "Less Rapid Spec." In this case, the user must choose Rapid Spec 400A, Rapid Spec 401A, or Rapid Spec 402A. If the user removes "Rapid Spec 400A, either "Rapid Spec 401A" or "Rapid Spec 402A" must be added in its place.

The configuration may be updated based on the user's modification (block 210). In some embodiments, the user may be prevented from making any further changes until the configuration has been validated. Additionally, a copy of the current valid configuration may be saved in memory (e.g., at client device 104a,b or server 108). In some cases, saving the current valid configuration may permit a user to undo or cancel a desired modification.

A valid configuration may have one feature from each family. Accordingly, the features within a family may be mutually exclusive. Thus, each feature that is added by the system results in another feature being removed by the system. As a non-limiting example, a current paint color may be "Tuxedo Black." The user seeks to add "Brilliant Silver" as the paint color. While from the user's perspective this action is a single step (e.g., select "Brilliant Silver"), the system 100 may perform the change in at least two steps: (1) add "Brilliant Silver" and (2) remove "Tuxedo Black."

A resolution matrix may be generated based on the modified feature (e.g., the added feature in the user-configured product) (block 212). The resolution matrix may contain all rows in a product configuration matrix that contain the modified (e.g., added) feature. The resolution matrix may be subset of the product definition and contain only product configurations with the newly added feature. Using this framework, the new configuration (e.g., the user-configured product) may be tested against this resolution matrix for validation. Advantageously, this may improve processing efficiency.

As a non-limiting example, referring to FIG. 6, the user may add "reverse sensing" as a product feature. A non-limiting representation of the product configuration and the resolution matrix may be represented as shown in the figure. The underlined values illustrated in FIG. 7a may represent the added feature of "reverse sensing."

A comparison of the resolution matrix and a binary representation of the user configuration (e.g., the user-configured product) may be performed to determine if the proposed user configuration is valid (block 214).

In one embodiment, the comparison may be performed by multiplying the resolution matrix by the transpose of the user configuration vector (or binary representation of the configuration) to create a checksum vector. The elements of the checksum vector may correspond to the product configurations in the resolution matrix. Using this framework, a valid configuration may be identified when one or more values of each checksum vector element are equal to the number of configuration features that match the product configuration in that row.

Alternatively, the comparison may be determined by the number of feature families that have a valid feature selected. Accordingly, if there are one or more values in the checksum vector equal to the number of feature families, every feature in the configuration may be considered to be included within the product configuration and the new configuration may be considered valid.

As illustrated in FIG. 7b, the product selected by the user may include 6 feature families with each family having a subset of product features. As described above, a resolution matrix may be generated from the selected product that includes a subset of product configurations. As is further illustrated in FIG. 7b, the logical transpose result of each user configuration and product configuration included within the resolution matrix may indicate the number of valid features that were selected by the user. For example, the transpose value of the first product configuration and the user configuration provides a result that all 6 selected user features are valid for the product selected.

If the user configuration is valid (block 216), the application 102 may wait for additional modifications from the user (block 206). Otherwise, if the user configuration is invalid (block 218), the process for validating the user configuration continues as described below.

As represented by block 220, when any portion of the user configuration results in an invalid product feature selection, path(s) to a valid user configuration may be determined. At least one method may be to identify one or more target configurations for comparison. The identification may be accomplished by identifying the maximum values in the checksum vector and selecting the corresponding product configuration(s) as the target(s). In some embodiments, since the resolution matrix contains only product configurations with the newly added feature, any path that removes that feature may be excluded from the identification process.

If a single target configuration is identified (block 222), one or more equivalent resolution paths may exist that have identical length and are independent. The process may proceed to Path A in which the invalid features based on the single target configuration may be determined (block 224).

A non-limiting example of identifying a single product configuration is illustrated in FIG. 7c. As illustrated, the maximum value (e.g., the number of valid features) is 5 which are present in one row of the checksum vector. As underlined, the target configuration is the third product configuration within the resolution matrix.

If two or more target configurations are identified, multiple dependent paths may exist. In this case, there may be at least two resolution approaches. At least one approach may be to arbitrarily select one of the product configurations as the sole target. Such an approach may result in a single resolution prompt to the user. At least one other approach may be to perform additional analysis on the potential targets to find the shortest path. Accordingly, such an approach may result in the shortest resolution path.

As illustrated in FIG. 7d, row 1 and row 3 of the checksum vector may have a maximum value 3, thereby indicating that each of these product configurations include at least 3 of the selected features within the user configuration. The product configurations in these rows may be further analyzed for determining a valid resolution. Accordingly, the process may proceed to Path B.

Referring now to Path A, the invalid features based on the single target configuration may be determined (block 224). In one embodiment, the number of invalid features may be determined by determining the difference between the number of feature families and the maximum checksum value. With reference back to FIG. 7d, there may be one invalid feature based on a difference between the number of feature families (e.g., 6) and the maximum checksum value (e.g., 5).

FIG. 7e illustrates an additional or alternative embodiments were the invalid features may be determined mathematically by using a logical conjunction (AND operator) between the elements of the user configuration and the elements of the target configuration. The resulting vector may be checked for families that contain all zero values. For example, FIG. 7e illustrates that the logical conjunction results in the fourth family (underlined) of the user configuration may not match the target configuration. Once the invalid feature(s) have been identified, a partial target configuration may be generated including only the invalid features. The process may continue with block 226 described in further detail below.

Referring now to Path B, two or more paths may be chosen based on the length of the resolution path (block 228). At least one path (block 230) may represent a resolution path having the same length. Whether a resolution path has the same length or different length may be identified based on the feature families requiring changes. In paths having the same length, for example, changes are required in the same set of feature families for all targets. Block 232 may be solved by creating a composite target. In resolution paths having different length (233), changes are required in different sets of feature families. Block 234 is solved by finding the target(s) with the shortest resolution path(s).

To determine the length (block 228), the invalid features for each product configuration may be determined. This may be accomplished, for example, by using a logical conjunction between the elements of the user configuration and the elements of each of the multiple target configurations. The resulting vectors may be checked for families that contain all zero values. For example, FIG. 7f illustrates both target configurations (target #1 and #2) having three invalid families (illustrated in the last row by underline).

Further, a checksum may be created for each family to calculate the number of product configurations which match. Mathematically, this can be accomplished by summing, by family, the vectors created by using the logical conjunction (AND operator) between the user configuration and each target configuration illustrated in FIG. 7f. The generated checksum may be analyzed to determine the resolution path lengths. As illustrated in FIG. 7g, families 1, 4 and 6 (underlined) of the configuration match both target configuration matrices from FIG. 7f. Alternatively, families 2, 3 and 5 match none.

Since every feature in the user configuration matches either all or none of the number of target configurations, in the above example, there may be two or more equivalent length paths that are dependent. The process may therefore continue at path B.1.

Alternatively, as shown in FIG. 7h, there may be two or more dependent paths of different lengths. Thus, FIG. 7h illustrates that families 1, 3, 4 and 6 (underlined) match all targets and families 2 and 5 match one target. In this case, the operation may continue at Path B.2.

With reference back to block 232, a composite target may be derived by computing a bitwise value for all target configurations using a logical disjunction (OR operator) and a logical conjunction (AND operator). FIG. 7i shows one non-limiting illustration of this operation using the target configurations (target 1 and 2) illustrated in FIG. 7h.

The families for which two or more target configurations offer alternative resolution paths may be identified for the previously identified invalid families. To accomplish this process, the logical conjunction values and the logical disjunction values between the targets may be compared. For example, FIG. 7j illustrates the family feature values generated in FIG. 7i are different based on the comparison (e.g., underlined families 2 and 5). As a result the comparison of the values generated in FIG. 7i may indicate that two or more resolution paths may exist.

If the invalid features in the target configurations have non-identical paths, a partial product configuration comprising of the value using the logical disjunction (OR operator) may be created to include all invalid feature families. For example, FIG. 8 illustrates when a fourth and fifth family feature are invalid. By comparing the logical disjunction (OR operator) values and the logical conjunction (AND operator) values between the targets shows that, for the fourth family, the target configurations (target 1 and 2) have identical values in the two product configurations (i.e., both offer the same paths for resolution). For the fifth family, however, each target configuration illustrated offers a potential different path for resolution. Since the choice in the fourth family won't restrict the choice for the fifth family, the logical disjunction (OR operator) value may be used as the target configuration. The process may continue at block 226 as described in further detail below.

Where 2 or more features have non-identical paths in the target configurations, the path for one or more features may be dependent on the resolution of one or more other features. Accordingly, two or more validation passes may be needed to resolve the conflict. However, it is contemplated that as many families as possible may be resolved in each pass.

As illustrated in FIG. 9a, the operation described above may be accomplished by creating partial target configuration (target value) from the logical disjunction (OR operator) value. All families that have identical paths in all target configurations (target 1 and 2) may be included. From left to right, the first family with differing resolution paths may be included.

For example, FIG. 9a illustrates that the second feature family (e.g., Rapid Spec), the third feature family (e.g., Paint) and the fifth feature family (e.g., Radio) may be invalid. As illustrated in FIG. 9b, analyzing the targets for Rapid Spec and Radio illustrates that these two choices may be dependent on each other. For example, if the user chooses Rapid Spec "Rapid.c," either Radio.6Cd or Radio Nav are valid choices, but if the user chooses Rapid Spec "Rapid.b," only Radio.6Cd may be valid.

As illustrated in FIG. 9c, the shortest resolution path for the example illustrated in FIG. 9a, may be determined in accordance with block 234. FIG. 9c illustrates that the values may be created when identifying invalid features using a logical conjunction (AND operator) method.

In the example shown in FIG. 9c, block 234 may remove from consideration any target without all 0's in that family. If more than one target remains, the operation may verify the accuracy of the next family. Otherwise, the process may continue with the single family comprising all 0's. Note that where the left to right ordering of the families in the configuration defines family priority, this method may ensure that any ties in path length are broken by making the user change the lowest priority invalid family first. In the example shown in FIG. 9c, target #1 only differs from the configuration in the second family (underlined). This means that the configuration could be made valid by prompting the user to change the second family. Target #2 only differs from the configuration in the fifth family (underlined)—this means that the configuration could be made valid by prompting the user to change the fifth family. Because the fifth family is the right-most family, it is considered to be a lower priority than the second family. By prompting the user to change the lower priority family, the user's current selections for the higher priority families are preserved.

In the example above, when processing the fifth family, the AND operator value for target 2 is found to have all 0's. Target 1 may be removed from consideration because the AND operator value for target 1 does not include all zeroes (e.g., has a 1 in the fifth family). Therefore, in this example, target 2 is the only surviving target.

Where one target remains, the process may continue at block 226 (described in further detail below).

If two or more targets remain, the process may continue at block 232 (Path B.1). Here, the remaining targets may have the same path length and will be combined into a composite target. For example, FIG. 10 illustrates taking the logical conjunction (AND operator) of a user configuration using three target configurations (targets 1-3). As illustrated, the resulting logical conjunction of target configurations 1 and 2 result in the third and fourth families having a bit representation of all 0's. In contrast, target configuration 3 may have a resulting value of 0's in the first and second family. Because target configurations 1 and 2 result in the closest resulting values, they would likely be determined as the surviving target configurations. Once the target (i.e. composite) configurations are determined, the process moves to block 226.

At block 226, the resolution process for all prompt paths may be handled. Corrective actions and user prompts may be derived as part of the resolution process.

For each family in the partial target configuration, the difference between the user configuration and the target configuration may be determined. The difference may be used to determine the corrective actions to take to transform the user configuration to a valid configuration that it is covered by a product configuration (e.g., the target configuration). The system may initiate user prompts derived to present these actions.

As illustrated in FIG. 11, the process for determining the corrective actions may include subtracting the user configuration from the target configuration vector. In this example, the product feature for a vehicle trim is analyzed. It will be appreciated that this is merely for illustration and the same process can be performed for any product feature found in a corresponding column of the user configuration.

By performing the operation illustrated in FIG. 11, at least two actions may be performed for the non-matching families. First, each family may be designated with one value of −1 which may represent the feature that should be removed. In this case, a "Remove Feature" designation may be set for the feature of the family. Second, each family maybe designated with one or more values of +1. If there is just one feature with a +1 value, an "Add Feature" designation may be added to the list of actions. Further, a user may be prompted with instruction that state: "You must change X to Y." Such a prompt may be provided to inform the user X represents the feature to be removed and Y represents the feature to add in order to have a valid configuration.

If there is more than one feature with a value of +1, these features may be added to an add feature list. The features of the add feature list may be presented as a radio button, check box, drop down menu, and the like. In this case, "Add One of 'Z'" may be added to the list of actions where "Z" represented the items of the add feature list. Further, "You must change X to one of Z" may be added to a list of prompts presented to the user where X represents the feature to be removed and Z represents the items of the add feature list. Of course, the language of the prompt is provided for illustration purposes and may be modified without departing from the scope of the invention.

Note that if either the Remove Feature or the Add Feature is not visible, the prompt can be modified accordingly. For Example, instead of prompting "You must remove Appearance Package and add Less Appearance Package", the prompt can simply be "You must remove Appearance Package."

Based on the example above, the subtraction process may result in the following features: Charcoal: 0; Stone: 0; Sport Blue: +1; Sport Red: −1.

Figure 12:
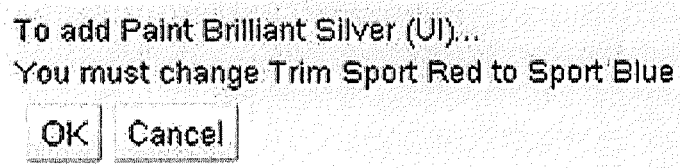
FIG. 12 is another non-limiting example of a user prompt.

Accordingly, the corrective action may be "Add Sport Blue" and the prompt may state "You must change Trim Sport Red to Sport Blue." The corrective action prompts to the user may be displayed with "Ok" and "Cancel." FIG. 12 shows an example of the prompt that may be displayed to the user.

With reference to block 236, the user may select either button in response to the prompt. If the user selects "cancel," (block 238) the configuration may be reset to the previously saved configuration (e.g., the saved configuration) (block 240). The process may continue at block 206 as described above in which additional user changes may be awaited.

If the user clicks "Ok," (block 242), the corrective change(s) may be set. For example, for each correction action, a feature may be added if the corrective action is to add a feature or, if the corrective action is to add one of the items in the add feature list, the user-chosen feature as determined by, for example, the selection of a radio button may be added.

For each corrective action, a feature may also be removed such that the prior feature value for the family may be removed. For example, FIG. 13 illustrates an example of the add/remove process being performed along with the corresponding result.

Once all corrective actions are performed, the process returns to Block 214 where the new user configuration may again be validated. It is contemplated that the process may guarantee the validity of any user configuration resulting from the single configuration sequence illustrated in FIG. 2 as "Path A." It is also contemplated that any user configuration corrections resulting from the multiple configuration sequence illustrated in FIG. 2 as "Path B" may require additional validation and resolution.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method for configuring a product, the computer-implemented method comprising:
   receiving at one or more computers a product configuration matrix representing a plurality of valid configurations of a product, the product configuration matrix being stored in a computer storage medium residing within the one or more computers;
   receiving at the one or more computers a user input defining a user selection of at least one feature or component of the product;
   generating at the one or more computers a binary representation of the user selection of at least one feature or component of the product;
   deriving at the one or more computers a resolution matrix from the product configuration matrix based on the binary representation of the user selection wherein the resolution matrix defines a subset of the product configuration matrix based at least in part on the user configuration;
   comparing at the one or more computers the resolution matrix and the binary representation of the user selection to determine whether one or more of the selected product features or components in the user selection are valid for the product; and
   generating at the one or more computers a validation result that identifies one or more valid product features or components within the user selection, wherein generating a validation result further comprises:
      generating a checksum vector based on the resolution matrix and a transpose of the user selection,
      determining one or more checksum vector values from the checksum vector, and
      determining which features of the user selection are invalid based on the checksum vector values;
   wherein the validation result identifies the binary representation of the user selection as invalid and the method further comprises resolving invalid configurations at the one or more computers by:
      identifying from one or more checksum vector values one or more product configuration matrices corresponding to a maximum number of features in the user selection that match at least one of the product configuration matrices, comparing the product configuration matrix to the user configuration, identifying at least one disparity between the product configuration matrix and the user selection, and resolving the at least one disparity, wherein the resolving the at least one disparity further comprises:

generating one or more modification proposals to the user selection based on the disparity, and outputting a notification with the one or more proposals.

2. The computer-implemented method of claim 1 wherein the product configuration matrix includes a bit corresponding to every configurable feature available in the product.

3. The computer-implemented method of claim 2 wherein deriving the resolution matrix includes extracting resolution data from the product configuration matrix.

4. The computer-implemented method of claim 2 wherein the product configuration matrix is included in a product definition that comprises at least a list of feature families, a list of features, at least one valid product configuration matrix for the product, and a default configuration matrix for the product.

5. The computer-implemented method of claim 1 wherein identifying the one or more product configuration matrices further includes identifying two or more product configuration matrices, the method further comprising:

comparing the binary representation of the user selection to each of the two or more product configuration matrices;

identifying one or more matching features between the user selection and each of the two or more product configuration matrices; and determining a resolution path for the invalid user selection based on a number of matching features.

6. The computer-implemented method of claim 5 wherein if the matching features are none or all, the resolution path further comprises:

deriving a composite target; and identifying at least one disparity based on the composite target; and resolving the at least one disparity.

7. The computer-implemented method of claim 6 wherein the steps for configuring the product are performed using logical operations.

8. The computer-implemented method of claim 1 wherein the method is performed locally at a client device and the computer storage medium storing the product configuration matrix is located on a remote server.

9. The computer-implemented method of claim 1 wherein the method is performed remotely on a server.

10. A computer-implemented method for configuring a product, the computer-implemented method comprising:

receiving a product configuration matrix representing a plurality of valid configurations of a product, the product configuration matrix being stored in a computer storage medium on a remote server and being received at a client device;

receiving on the client device user input defining a user selection of at least one feature or component of the product;

generating on the client device a binary representation of the user selection of at least one feature or component of the product;

deriving on the client device a resolution matrix from the product configuration matrix based on the binary representation of the user selection wherein the resolution matrix defines a subset of the product configuration matrix based at least in part on the user configuration;

comparing on the client device the resolution matrix and the binary representation of the user selection to determine whether one or more of the selected product features or components in the user selection are valid for the product; and generating on the client device a validation result that identifies one or more valid product features or components within the user selection, wherein generating a validation result further comprises:

generating a checksum vector based on the resolution matrix and a transpose of the user selection, determining one or more checksum vector values from the checksum vector, and determining which features of the user selection are invalid based on the checksum vector values;

wherein the validation result identifies the binary representation of the user selection as invalid and the method further comprises resolving invalid configurations by:

identifying on the client device from one or more checksum vector values one or more product configuration matrices corresponding to a maximum number of features in the user selection that match at least one of the product configuration matrices, comparing on the client device the product configuration matrix to the user configuration, identifying on the client device at least one disparity between the product configuration matrix and the user selection, and resolving on the client device the at least one disparity, wherein the resolving the at least one disparity further comprises:

generating one or more modification proposals to the user selection based on the disparity, and outputting a notification with the one or more proposals.

11. The computer-implemented method of claim 10 wherein the product configuration matrix includes a bit corresponding to every configurable feature available in the product.

12. A computer system for configuring a product comprising:

a processor configured to:

receive a product configuration matrix representing a plurality of valid configurations of a product, the product configuration matrix being stored in a computer storage medium;

receive user input defining a user selection of at least one feature or component of the product;

generate a binary representation of the user selection of at least one feature or component of the product;

derive a resolution matrix from the product configuration matrix based on the binary representation of the user selection wherein the resolution matrix defines a subset of the product configuration matrix based at least in part on the user configuration;

compare the resolution matrix and the binary representation of the user selection to determine whether one or more of the selected product features or components in the user selection are valid for the product; and generate a validation result that identifies one or more valid product features or components within the user selection, wherein the validation result further comprises:

a checksum vector based on the resolution matrix and a transpose of the user selection, one or more checksum vector values from the checksum vector, wherein the processor is configured to determine which features of the user selection are invalid based on the checksum vector values;

wherein the processor is configured to generate validation results that identify the binary representation of the user selection as invalid and the processor is further configured to resolve invalid configurations by:

identifying from one or more checksum vector values one or more product configuration matrices corresponding to a maximum number of features in the user selection that match at least one of the product configuration matrices, comparing the product configuration matrix to the user configuration, identifying at least one disparity between the product configuration matrix and the user selection, and resolving the at least one disparity by:
generating one or more modification proposals to the user selection based on the disparity, and
outputting a notification with the one or more proposals.

13. The system of claim 12 wherein the processor is located within a client device, and the computer storage medium storing the product configuration matrix is located on a remote server.

* * * * *